United States Patent [19]

Teske

[11] 4,311,426
[45] Jan. 19, 1982

[54] SYSTEM FOR RECLAIMING BULK SOLIDS FROM A STORAGE PILE

[76] Inventor: Lothar Teske, Hegelstr. 15, Köln, Fed. Rep. of Germany

[21] Appl. No.: 44,657

[22] Filed: Jun. 1, 1979

Related U.S. Application Data

[63] Continuation-in-part of Ser. No. 964,922, Nov. 30, 1978, Pat. No. 4,249,845.

[30] Foreign Application Priority Data

Jun. 2, 1978 [DE] Fed. Rep. of Germany .......... 46491

[51] Int. Cl.³ .............................................. B65G 63/00
[52] U.S. Cl. ................................... 414/133; 198/518; 414/306
[58] Field of Search ............... 414/523, 306, 288, 133, 414/144, 145; 198/506, 508, 517, 518, 520, 522

[56] References Cited

U.S. PATENT DOCUMENTS 3,642,153  2/1972  Adler et al.

FOREIGN PATENT DOCUMENTS

| | | |
|---|---|---|
| 509415 | 3/1952 | Belgium ............................ 414/133 |
| 203010 | 8/1907 | Fed. Rep. of Germany . |
| 312814 | 8/1918 | Fed. Rep. of Germany . |
| 1127282 | 8/1960 | Fed. Rep. of Germany ...... 414/306 |
| 1276552 | 8/1968 | Fed. Rep. of Germany ...... 414/306 |
| 1286963 | 1/1969 | Fed. Rep. of Germany . |
| 2346239 | 9/1973 | Fed. Rep. of Germany ...... 414/133 |
| 1547567 | 10/1968 | France ............................... 414/133 |
| 999958 | 7/1965 | United Kingdom ................ 414/133 |

*Primary Examiner*—Frank E. Werner
*Attorney, Agent, or Firm*—Karl F. Ross

[57] ABSTRACT

A system for reclaiming bulk solids from a storage pile outside on the ground or inside in a warehouse has a longitudinally extending row of arches that stand underneath the pile on the ground and that are interconnected by at least one beam extending longitudinally along the row of arches. A longitudinally extending and downwardly concave roof is supported on the arches and has lower edges spaced above the ground. A longitudinally extending conveyor is provided underneath the roof and below its lower edges. A carriage is reciprocated the full length of the row beneath the roof and above the conveyor while rotating an impeller about an upright axis. This impeller has arms which define an orbit projecting horizontally outwardly beyond the lower edges of the roof into the pile so that when rotated it sweeps bulk solids from the pile onto the conveyor so that the conveyor in turn can carry these bulk solids longitudinally out of the pile.

17 Claims, 6 Drawing Figures

SYSTEM FOR RECLAIMING BULK SOLIDS FROM A STORAGE PILE

CROSS-REFERENCE TO RELATED APPLICATION

This application is a continuation-in-part of my application No. 964,922 filed Nov. 30, 1978 now U.S. Pat. No. 4,249,845.

FIELD OF THE INVENTION

The present invention relates to a system for reclaiming bulk solids from a large bulk-solid storage pile standing on the ground.

BACKGROUND OF THE INVENTION

Open-yard storage of solids in bulk is used for doal, various ores, and similar bulk solids not susceptible of substantial degradation by normal weather conditions. As in any type of storage system it is normally considered desirable to rotate the stored material, that is to reclaim the material in the order it was stored so that the last material stored is the last material used. This necessitates, of course, reclaiming the material from the bottom of the pile, which in some systems can be several hundred meters long and ten to twenty meters high.

The standard procedure of simply using a crane or the like obviously makes it impossible to rotate the material, as the crane or other such arrangement must take material off the top of the pile. Such an arrangement has the further considerable disadvantage that when the pile is inside a warehouse one must provide sufficient headroom above the pile to allow for movement of the overhead crane or the like.

It is also standard practice to form in the ground underneath the normally elongated pile an underground tunnel made of reinforced concrete. A heavy-duty conveyor belt is provided in this tunnel. Floor gates, such as described in my earlier patent application No. 872,832 filed Jan. 27, 1978 (now U.S. Pat. No. 4,186,854), allow the material to drop through the floor under the pile, which floor is also the roof of the tunnel, onto the conveyor belt. It is also known to provide such floor openings with unloading carriages such as described in my copending application No. 855,270 filed Nov. 28, 1977 (now abandoned).

The disadvantage of this last-described system is that the construction of the underground tunnel is an extremely expensive operation. Furthermore in the event the storage system is no longer needed it is impossible to reuse or employ elsewhere most of the elements of the reclaiming system.

OBJECTS OF THE INVENTION

It is therefore an object of the present invention to provide an improved system for reclaiming bulk solids from a large storage pile standing on the ground.

Another object is the provision of such a system which is substantially less expensive to construct than the prior-art systems.

A further object is to provide such a system wherein a bulk-solid storage pile in a warehouse or the like can be as high as the ceiling of the warehouse.

A further object of this invention is to provide a bulk-solid reclaiming system which can be dismantled and reused if necessary.

SUMMARY OF THE INVENTION

These objects are attained according to the instant invention in a system for reclaiming bulk solids having a longitudinally extending row of supports standing underneath the pile on the ground and interconnected by at least one longitudinally extending beam which is secured to these supports. A longitudinally extending and preferably downwardly concave roof is supported on this row of supports and has horizontally and transversely spaced lower edges spaced above the ground. A conveyor extends longitudinally underneath the roof and below the lower edges thereof. A carriage can be displaced longitudinally along the row of supports beneath the roof and above the conveyor and carries an impeller rotatable about an upright axis and having arms defining an orbit that projects horizontally outwardly beyond the lower edges of the roof into the pile. This impeller can be rotated about its axis to sweep bulk solids from the pile onto the conveyor which in turn is driven to longitudinally carry away the bulk solids swept by the impeller arms onto it.

Thus the system according to the instant invention can be built on the ground or floor without the necessity of excavating. Thereafter the bulk solids are simply dumped on top of the longitudinally extending row of supports to form a storage pile which completely covers it except, according to another feature of this invention, at the ends thereof. Such a system ensures that the bulk solids are reclaimed from the bottom of the pile, so that materials subject to long-term degradation such as gypsum or cement will be rotated.

According to further features of this invention the supports are arches having feet standing on the ground and the roof is formed by at least two panels fitting over these arches and extending at an angle of less than 90° to each other, the same angle that the legs of the arches have relative to each other. Thus the roof and arch arrangement allows tons of materials to be piled on top of the arrangement according to the instant invention without damage, and the relatively sharp angles of the sides of the roof ensure that this material will be able to move downwardly as it is reclaimed from the bottom of the pile. Providing substantially vertical skirts forming the lower edges of the roof at the lower edges of each of the panels further prevents bridge formation and the like in the bulk solids.

In accordance with further features of this invention the longitudinal beams extending along the arches are provided with guide rails for the carriage, which itself is of the general type described in my above-cited copending application 855,270. The carriage itself can be displaced by means of at least one cable attached to it and extending longitudinally in both directions so that the carriage can be pulled through the row of arches from one end and then pulled back through from the other end while an electric motor on the carriage rotates the impeller thereof. The electric motor in turn can be supplied with electricity through an electric cable that winds itself up on a spring-loaded reel as the carriage moves back and forth.

The system according to the instant invention is particularly usable when the bulk solids are to be stored inside. Thus this arrangement could be used with relatively perishable material such as grain. In this situation the ends of the guide for the carriage as well as the ends of the longitudinal conveyor extend outwardly beyond the pile into roofed-over rooms in which the various elements of the system can be worked on. Thus regular maintenance or repairs can be carried out without having to dig into the pile, as the only structure underneath the pile is the supports, guide rails, and the like which are very robustly built and normally not susceptible of breakdowns. In fact in the event of a breakdown it is possible to obtain longitudinal access from the ends into the row of supports.

It is also possible as described in my other above-cited copending application No. 964,922 to provide a pair of longitudinally extending parallel tables underneath the row of arches and below the lower edges of the roof. Each such table has an outer edge turned away from the other table and an inner edge defining with the inner edge of the other table a horizontally extending and vertically open slot. The longitudinally extending conveyor is underneath and generally parallel to the slot and the tips of the impeller arms extend out from underneath the lower edges of the roof in the spaces between the tables and these lower edges. Side walls flank the conveyor and are supported on the arches, each side wall having an upper edge joined to the respective table and a lower edge, so as to prevent the bulk solids from getting into the conveyor from the side. This system completely eliminates the necessity of expensive underground tunnels. Instead the conveyor itself is provided in a passage, normally at least 1.5 meters high, so that service personnel can move through it if necessary, and a simple roof arrangement fitted to the row of arches allows the bulk solids to flow horizontally in on the tables so that they can be pushed into the slot and fall on the conveyor. This system furthermore can, if necessary, be completely dismantled as at most all that need be permanently built are some footings for the feet of the arches.

The longitudinal conveyor according to this invention can be a simple endless belt having an upper reach and a lower reach. The lower reach can be used for conveying the solids and the upper reach can extend backwardly in the row of arches above the carriage. A stripper is provided at the downstream end of the lower reach to clear bulk solids carried thereby from this conveyor belt.

It is also within the scope of this invention to provide a heavy-duty scraper-type conveyor or even a bucket-type conveyor. Thus the device can readily be used to handle even extremely bulky and lumpy solids, such as coal. The lower reach can move in a channel that may be recessed in the ground or above the ground.

SPECIFIC DESCRIPTION

Figure 1:
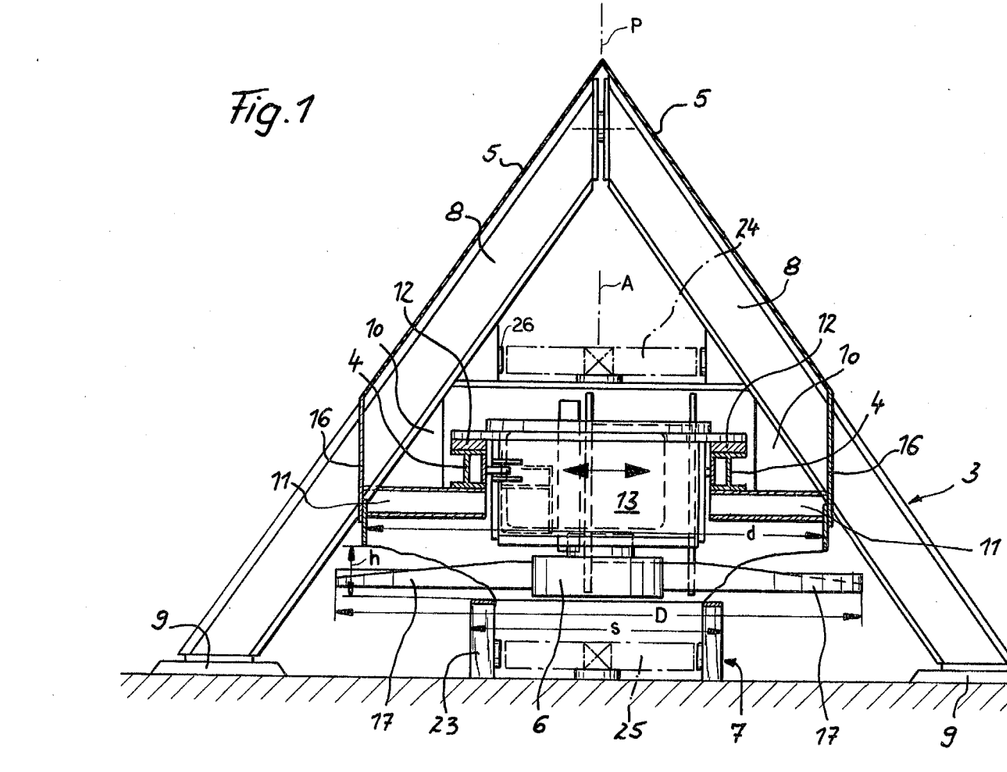
FIG. 1 is a vertical cross section through the system according to this invention.
Figure 2:
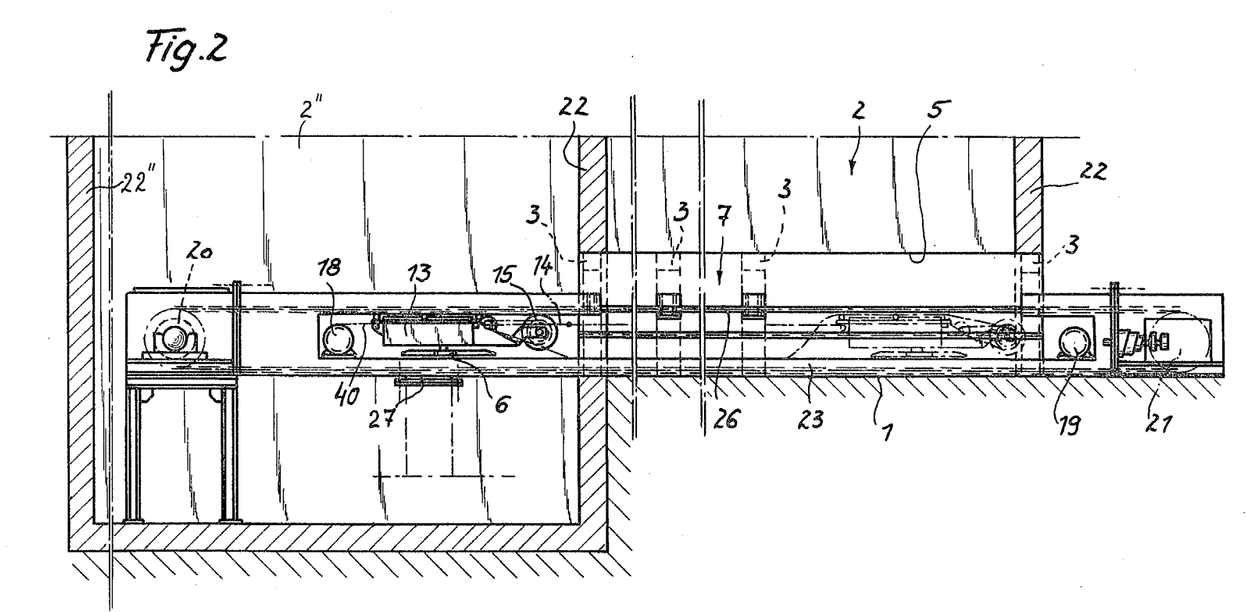
FIG. 2 is a vertical longitudinal section taken along the plane indicated in FIG. 1 at P through a portion of the apparatus of FIG. 1, but in smaller scale than FIG. 1.
Figure 3:
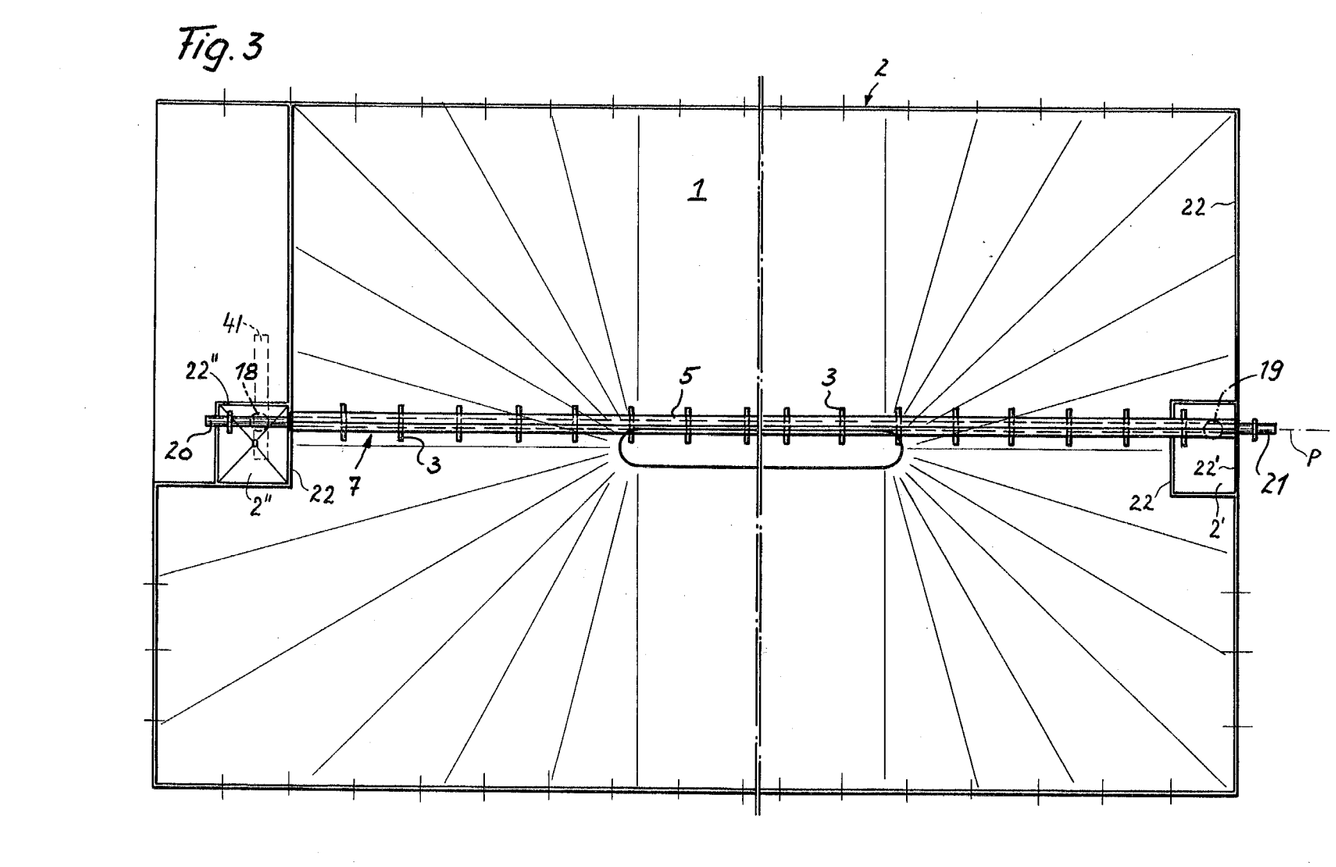
FIG. 3 is a top view of the system of FIGS. 1 and 2, but in smaller scale than FIG. 2.

As shown in FIGS. 1-3, the system according to the instant invention is adapted to stand at the ground level 1 inside a roofed-over warehouse 2. This system comprises a row of identical A-frame arches 3 interconnected by longitudinally extending I-beams 4. The arches 3 support roof plates 5 lying at an angle of 70° to each other and symmetrically flanking a vertical symmetry plane P of the system.

The arches 3 have legs 8 carrying inwardly extending beams 11 secured in place by means of gusset plates 10 and themselves supporting the longitudinal I-beams 4. These legs 8 have feet 9 which are anchored to the ground 1.

The longitudinal beams 4 carry rails 12 along which moves a carriage 13 having an impeller 6, similar to that described in my above-cited application No. 855,270 and rotatable about an upright axis A lying in the plane P. Underneath the impeller 6 is a longitudinal conveyor 7. In addition this impeller 6 has arms 17 forming an orbit of a diameter D one-seventh larger than the transverse distance d between the lower edges of skirt panels 16 extending vertically down from the lower edge of the roof panels 5. Thus when the arches 3 are buried under a pile of bulk solids the tips of these arms 17 will extend into the pile.

The carriage 13 houses an electric motor that rotates the impeller 6 about the axis A. This motor is powered through an electrical wire 14 that extends longitudinally out one end of the system and is automatically wound up on a spring-loaded spool 15 as the carriage 13 moves back and forth under the row of arches. This displacement of the carriage 13 in the row of arches is effected by means of a cable 40 spanned at the downstream end of this system over a powered winch 18 and at an upstream end of the system over another winch 19. Thus the winch 18 can pull the carriage 13 downstream and the winch 19 can pull it upstream.

The conveyor 7 as shown in FIGS. 1-3 is a simple belt- or apron-type conveyor having an upper reach 24 above the path of the carriage 13 and a lower reach 25. The belt 24, 25 is spanned over a drive roller 20 at the downstream end of this system and a reversing roller 21 at the upstream end, the latter roller 21 being spring-biased away from the roller 20 to maintain tension in the belt 24, 25. The belt 24, 25 is displaced so that the lower reach 25 moves toward the downstream end at the roller 20. In addition short upstanding side walls 23 spaced apart by a spacing s equal to approximately half of the distance d prevent material from the pile from entering underneath and laterally onto the reach 25. In fact the vertical height h of the lower edge of the skirt 16 above the upper edge of the side walls 23 is such relative to the heap angle of the bulk solids in question that they are not able to flow all by themselves horizontally into the space between the walls 23, but will only move onto the lower reach 25 of the conveyor 7 when swept thereonto by the arm 17. Guides 26 are provided for the upper reach 24 of the belt 24, 25.

FIGS. 2 and 3 show that the system according to this invention passes through the warehouse 2 and through end walls 22 of this warehouse 2 into an upstream room 2' and a downstream room 2" respectively enclosed with roof and side walls 22' and 22". The downstream chamber 2" has an outlet opening 27 into which the bulk solids are fed from the lower reach 25 of the belt 24, 25, and the length of this downstream chamber 2" is sufficient that the entire carriage 13 can be pulled into it for maintenance or repair. Thus all of the critical parts of the system according to this invention lie wholly outside the pile in separate rooms where they can easily be serviced. In this manner the material inside the storage chamber 2 can be heaped right up to the ceiling if desired.

Figure 4:
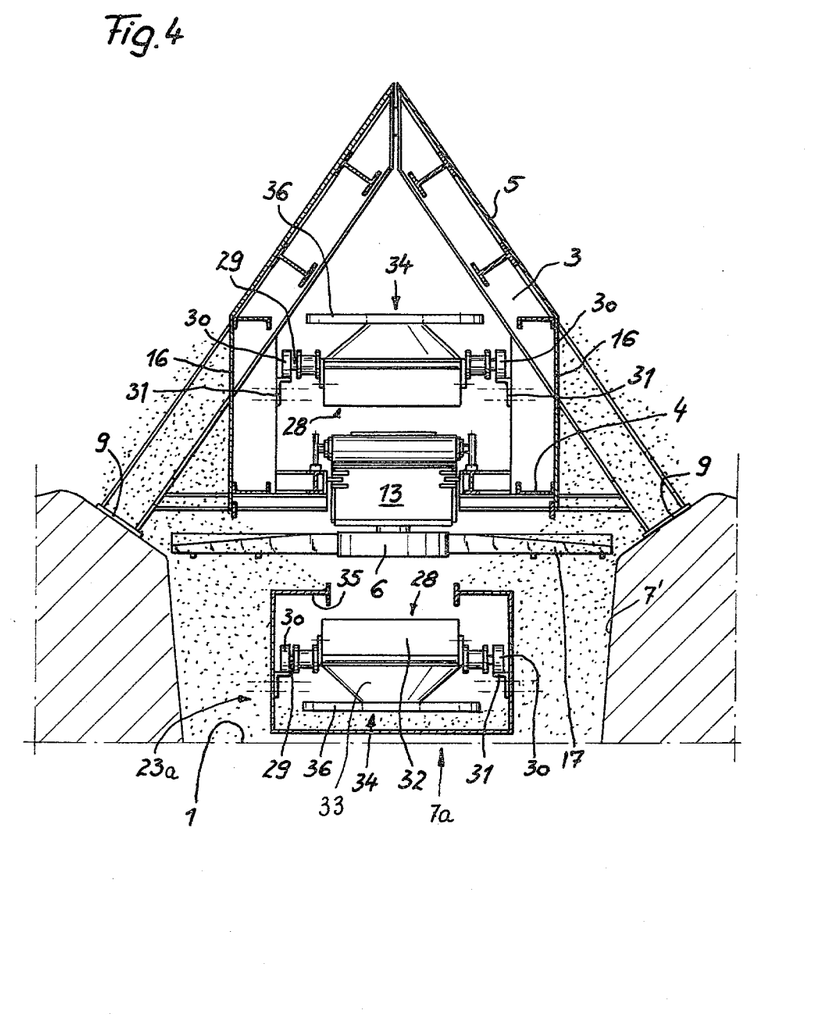
FIGS. 4, 5, and 6 are views similar to FIG. 1 illustrating variants of the system according to this invention.

FIG. 4 shows an arrangement substantially identical to that of FIG. 1, except that a bucket-type conveyor 7a is employed having a succession of buckets 28 supported on axles 29 riding via rollers 30 on rails 31 which for the lower stretch are supported inside a channel 23a and for the upper stretch are supported on the gusset plates 10. Each bucket 28 has a square-section upper part 32 and a downwardly tapered lower part 33 opening at an outlet opening 34. The outlet opening 34 is flanked by scraper elements 36 to displace material that leaks out of or past these buckets 28 along the channel 23a. Furthermore the channel 23a has inwardly extending flanges or lips 35 having inner edges above the upper portions 32 of the buckets 28 in the lower stretch to prevent the bulk solids from leaking in around the rollers 30. In this arrangement the lower portion is received in a trench 7'.

Figure 5:
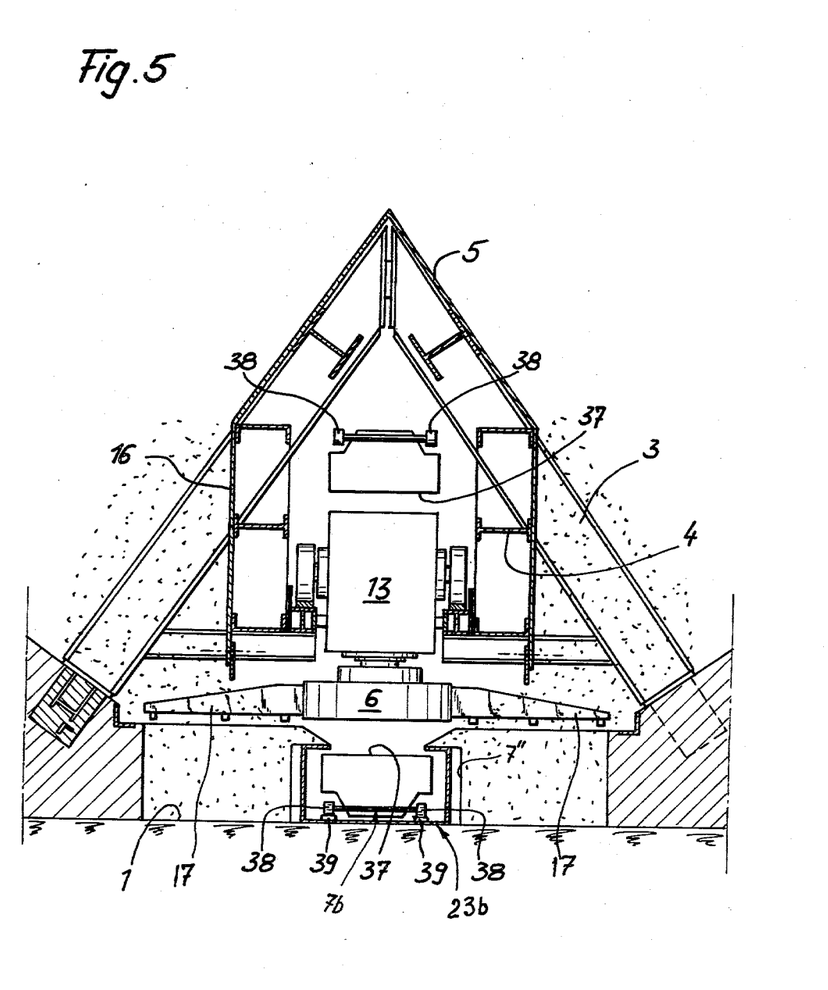

In FIG. 5 a scraper-type conveyor 7b is provided having scraper plates 37 supported via rollers 38 on rails 39. In this arrangement the channel 23b is received below the ground 1 in a concrete-reinforced trench 7" and substantial footings are provided for the legs 8 of the arches 3 for a permanent and extremely heavy-duty system. In both of the systems of FIGS. 4 and 5 roller chains interconnect the successive elements of the conveyors and a transverse stripper 41 clears the conveyors at the outlet 27. It is also noted that in the arrangement of FIGS. 1-3 the belt 24, 25 can be constituted as an apron conveyor if desired.

Figure 6:
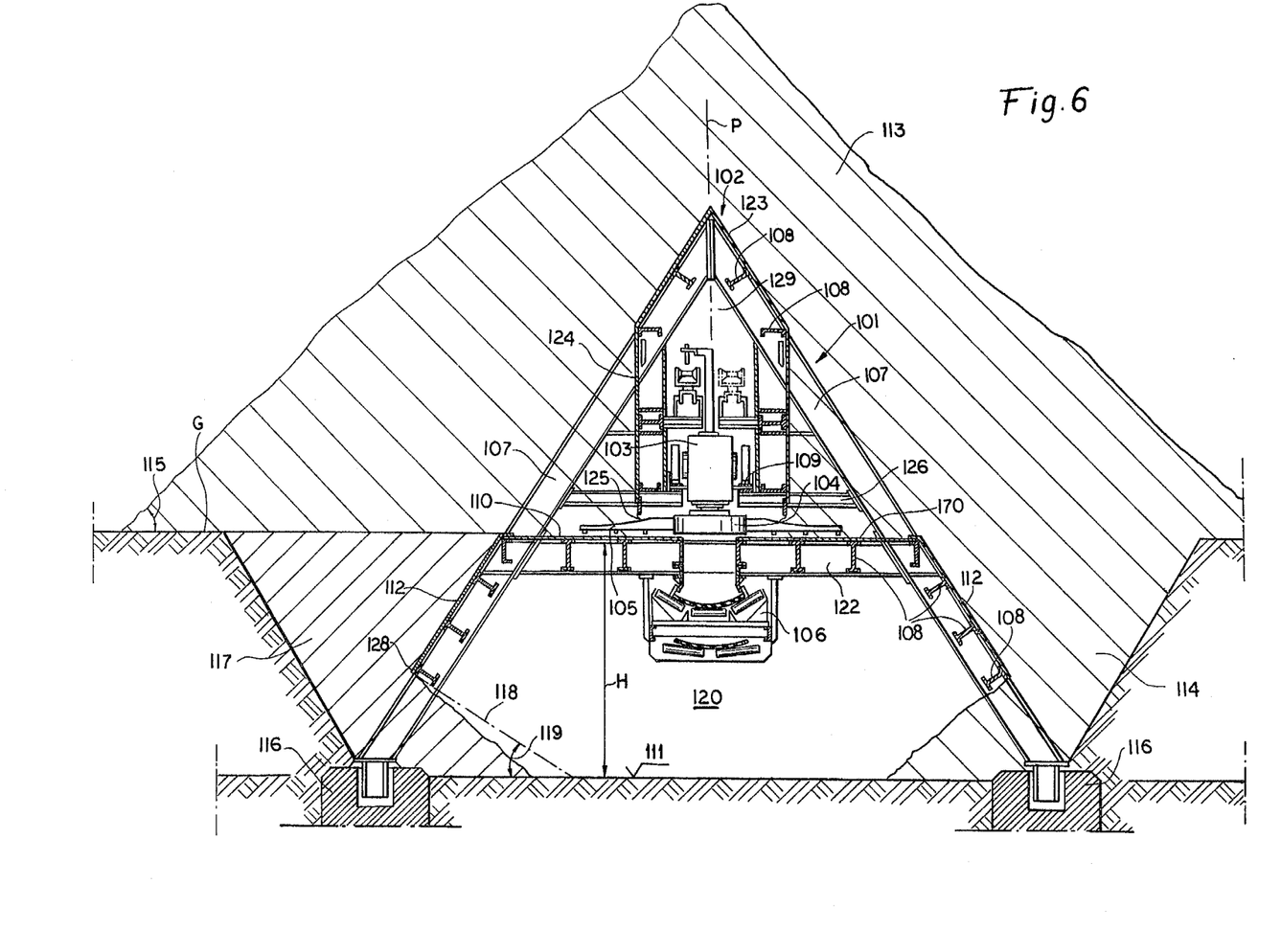

FIG. 6 shows a system substantially identical to that described in my above-cited copending application No. 964,922. Here there is shown a system for reclaiming bulk solids from a large bulk-solids storage pile 113 which has a row of like A-frame arches 101 each having a pair of legs 107 extending at an angle of substantially 60° to each other and a horizontal cross member or span 122. These arches 101, which can also be made of standard round-top arch shape if desired, are arranged in a row and are interconnected longitudinally within the row both at the legs 107 and at the cross member 122 by means of longitudinally extending beams 108. The lower ends of the legs 107 sit in footings 116 at the base 111 of a trench 114 lying below the ground level G.

Carried on this row of arches 101 is a roof structure 102 comprising plates 123 secured externally to the legs 107 and beams 108 at the apexes of the arches 101, and vertical plates 124 having lower edges 125 spaced above the ground level G.

A carriage 103 can be displaced longitudinally within the row of arches 101 on rails 109 carried on cross members 126 above the main cross members 122. This carriage 103 is provided with an impeller wheel 104 having horizontally and radially extending arms 105 that can be displaced angularly about a vertical axis A of the carriage 103. This unloading carriage is virtually identical to that described in my above-cited copending application No. 855,270. The arms 105 extend horizontally outwardly below the lower edges 125 of the side part 124 of the roof 102.

Carried on the main cross member 122 is a pair of horizontally spaced plates 110 at the ground level G and each having an outer edge at the extreme outer edge of the arches 101 and an inner edge spaced somewhat outwardly of the symmetry plane P of the system so as to form a downwardly open gap or slot.

Hung from the cross members 122 below the slot is a belt-type conveyor 106 which extends longitudinally beyond the roof 102 at the exposed end of this system above a transverse upward conveyor.

Secured to the outer side of the arches 101 are side plates or walls 112 having lower edges 128 spaced above the floor 111 of the trench 114 by such a distance that a perpendicular 118 drawn from the side wall 112 at the edge 128 will form an angle 119 with the floor 111 that is no greater than the angle 115 of repose of the material forming the pile 113. Thus the side plates 112, which meet at their upper edges with the tables 110, will form an open passage 120 having a height H below the plates 10 of approximately 2 meters. This passage 120 is therefore largely adequate for a service person in case the conveyor 106 needs servicing. In the event that the carriage 103 or its associated parts need servicing it can be drawn longitudinally out of the passage 129 formed between the side walls 124 for access to the interior. The carriage 103 is normally pulled back and forth by means of a cable.

The arrangement described above is simply constructed by digging the trench 114 and emplacing the footings 116. The arches 101 are then stood on the footings 116 and interconnected by means of the longitudinal beams 108. Thereafter the various sideplates 123 and 128 are mounted, along with the other structural parts. The entire arrangement may be then covered with the pile 113, or fill 117 can be employed as shown to the left in FIG. 6.

In use the conveyor 106 operates continuously and the carriage 103 is slowly reciprocated longitudinally the full length of the pile 113 so as to undermine it and displace the material that flows underneath the edges 125 onto the tables 110 into the slot 127, so that the conveyor 106 can carry it out.

I claim:

1. A system for reclaiming bulk solids from a large bulk-solids storage pile standing on the ground, said system comprising:

a longitudinally extending row of supports standing underneath said pile on the ground;

at least one beam extending longitudinally along said row and secured to said supports;

a longitudinally extending roof supported on said row of supports and having horizontally and transversely spaced lower edges spaced above the ground;

a longitudinally extending bucket-type conveyor underneath said roof and below said lower edges thereof, said conveyor having
 a conveyor element having upper and lower reaches extending longitudinally the full length of said row,
 reversing wheels at the upstream and downstream ends of said row over which said conveyor element is spanned,
 a plurality of buckets each in turn having a bottom outlet, and
 guide rails supporting said buckets;

a carriage displaceable longitudinally along said row beneath said roof and above said conveyor;

an impeller on said carriage rotatable about an upright axis and having arms defining an orbit projecting horizontally outwardly beyond said lower edges into said pile;

means for rotating said impeller about said axis and thereby sweeping bulk solids from said pile onto said conveyor;

means for driving said conveyor and thereby longitudinally carrying away the bulk solids swept by said impeller arms onto said conveyor; and a channel recessed in the ground and receiving said lower reach, said channel having a lower wall normally blocking said bottom outlets except at the downstream end of said lower reach.

2. The system defined in claim 1 wherein each of said supports is an arch having a pair of legs standing on the ground.

3. The system defined in claim 2 wherein the legs of each arch are substantially symmetrical about a vertical and longitudinally extending symmetry plane.

4. The system defined in claim 3 wherein each leg of each arch extends at an angle of less than 90° to the other leg of the respective arch.

5. The system defined in claim 4 wherein said roof has a pair of roof panels one of which lies on the legs of said arches to one side of said plane and the other of which lies on the other legs of said arches to the other side of said plane.

6. The system defined in claim 5 wherein said roof includes a pair of substantially vertical skirt panels extending downwardly from said roof panels and defining said lower edges.

7. The system defined in claim 1 wherein said longitudinal beam is provided with a guide rail for said carriage, said means for rotating being a motor on said carriage.

8. The system defined in claim 7, further comprising means for displacing said carriage along said rail during rotation of said impeller.

9. The system defined in claim 8 wherein said means for displacing said carriage includes a cable extending longitudinally the full length of said row and connected to said carriage.

10. The system defined in claim 9 wherein said cable has a pair of generally parallel stretches extending along said row, one of said stretches being connected to said carriage, said means for displacing said carriage including two reversing wheels, one at each end of both of said stretches.

11. The system defined in claim 10 wherein said ends and wheels are outside said pile.

12. The system defined in claim 7 wherein said motor is an electric motor provided with an electric feed wire extending longitudinally along said row and out from beneath said pile.

13. The system defined in claim 12 wherein said carriage is provided with a spring-loaded windup drum for said wire.

14. The system defined in claim 1 wherein said upper reach is above said carriage and impeller and said lower reach therebelow.

15. The system defined in claim 1, further comprising wall and roof structures surrounding said wheels which are outside of said pile.

16. The system defined in claim 1 wherein said channel has side walls extending upwardly beyond the buckets in said lower reach, said side walls having inwardly projecting lips overreaching said rails and thereby preventing the bulk solids from falling onto said rails.

17. The system defined in claim 1 wherein said buckets are provided with scrapers displaceable along said channel.

* * * * *